United States Patent [19]
Mori

[11] Patent Number: 5,598,516
[45] Date of Patent: Jan. 28, 1997

[54] IMAGE SYNTHESIZING SYSTEM AND VIDEO GAME APPARATUS USING THE SAME

[75] Inventor: Kazuhiro Mori, Yokohama, Japan

[73] Assignee: Namco Ltd., Tokyo, Japan

[21] Appl. No.: 393,017

[22] PCT Filed: Jun. 21, 1994

[86] PCT No.: PCT/JP94/00989

§ 371 Date: Mar. 20, 1995

§ 102(e) Date: Mar. 20, 1995

[87] PCT Pub. No.: WO95/00918

PCT Pub. Date: Jan. 5, 1995

[30] Foreign Application Priority Data

Jun. 21, 1993 [JP] Japan ..................... 5-173698

[51] Int. Cl.$^6$ ................................. G06F 15/00
[52] U.S. Cl. ................................. 395/126
[58] Field of Search ................ 395/126, 131, 395/132, 155, 161; 358/532

[56] References Cited

U.S. PATENT DOCUMENTS

| | | | |
|---|---|---|---|
| 5,452,408 | 9/1995 | Westdijk et al. | 395/131 |
| 5,517,603 | 5/1996 | Kelley et al. | 395/126 |

FOREIGN PATENT DOCUMENTS

| | | |
|---|---|---|
| 5-22658 | 1/1993 | Japan . |
| 5-249939 | 9/1993 | Japan . |

OTHER PUBLICATIONS

"Computer Graphics Principles and Practice", J. D. Foley, A. van Dam, S. K. Feiner, and J. F. Hughes, Second Edition (1992), Addison–Wesley Publishing Co., (USA), pp. 610, 727–728.

Primary Examiner—Phu K. Nguyen
Attorney, Agent, or Firm—Oliff & Berridge

[57] ABSTRACT

An image synthesizing system is formed to perspectively transform and project a 3-D object in a virtual 3-D space represented by a combination of polygons onto a projection plane in a view-point coordinate system and to calculate color specifying data for each pixel to display an image on a display 18. The image synthesizing system has a depth information transforming unit 30 for transforming a depth information Z in the view-point coordinate system of each polygon into a depth information Z' for the depth cueing, a color palette 28 responsive to the color specifying data for each pixel for outputting a color signal as a front-color signal, a depth cueing information setting unit 26 for calculating a depth cueing back-color signal 320 depending on the displayed scene, and a color signal calculation unit 36 responsive to the depth information Z' for the depth cueing, front-color signal and back-color signal for forming and outputting a depth-cued color signal 350 for each pixel.

34 Claims, 8 Drawing Sheets

$$\text{OUTPUT COLOR } c = (b-a) \times \frac{Z'}{255} + a$$

$$(0 \leq Z' \leq 255)$$

IMAGE SYNTHESIZING SYSTEM AND VIDEO GAME APPARATUS USING THE SAME

BACKGROUND OF THE INVENTION

1. Field of the Invention

The present invention relates to an image synthesizing system using a depth cueing technique and a video game apparatus using such an image synthesizing system.

2. Related Art

There is known an image synthesizing system which uses the computer graphics technique to synthesize a pseudo 3-D image. Such an image synthesizing system is broadly used in various applications such as video games, various simulators and others.

Such an image synthesizing system uses a depth cueing technique in which the brightness in a polygon is varied depending on the distance between that polygon and the view point.

The image synthesizing system of the prior art has such a problem that the depth cueing is not carried out while reducing the burden on the hardware.

In the image synthesis through the depth cueing technique, the brightness of a polygon is varied depending on its Z coordinate representing the distance between that polygon and the view point in a virtual 3-D space so that the polygon will fade into the background in the direction of depth.

However, the prior art requires to provide memories equal in number to N for color palettes into which color information is to be written if the brightness of the polygon in the direction of depth is to be progressively varied through N steps (where N is an integer) depending on its Z coordinate. For example, the base color may be written into the first palette; the next color may be written into the second palette; . . . and a color faded into the background may be written into the final or N-th palette. When the brightness of the polygon is to be smoothly varied through such a technique, a great number of palettes must be provided. This correspondingly increases the memory capacity, leading to increase of the manufacturing cost of the entire system.

Particularly, in the present image synthesizing systems, a great number of basic palettes are frequently used to represent colors delicately. In such a case, if the number of basic palettes is equal to M, palettes equal to MxN in number must be provided. This further increases the memory capacity.

The burden on CPU used for calculation increases correspondingly. Thus, it could not be avoided that the entire system would be more expensive and complicated.

In view of such problems of the prior art, an object of the present invention is to provide an image synthesizing system of simpler structure capable of performing the depth cueing and a video game apparatus using such an image synthesizing system.

SUMMARY OF INVENTION

To this end, the present invention provides an image synthesizing system for perspectively transforming and projecting a 3-D object in a virtual 3-D space represented by a combination of polygons onto a projection plane in a view-point coordinate system to calculate front-color specifying data for every pixel and to synthesize an image to be displayed, the image synthesizing system comprising:

depth cueing information setting means for setting back-color signals used in the depth cueing depending on a scene displayed and for calculating the depth information of the each polygon in the view-point coordinate system;

a first color palette responsive to the front-color specifying data output corresponding to each pixel for outputting a color signal as a front-color signal; and color signal calculation means responsive to the depth information, the front-color signal and the back-color signal for outputting a depth-cued color signal for each pixel.

The depth cueing information setting means is operative to set the back-color signal used in the depth cueing, depending on a scene displayed.

In addition, the depth cueing information setting means outputs the depth information of each polygon in the view-point coordinate system.

The first color palette is responsive to the color specifying data from each pixel for outputting the color-signal as front-color signal.

The color signal calculating means is responsive to the depth information, front-color signal, back-color signal for calculating, outputting and displaying the depth-cued color signal for each pixel on a display.

By setting the back-color signal used in the depth cueing depending on each scene in such a manner, the present invention can calculate and determine the depth-cued color signal. Even if the brightness is varied through a number of steps in the direction of depth, therefore, the present invention requires less color palettes and can provide a simplified and inexpensive structure of the entire circuit.

The present invention also provides an image synthesizing system for perspectively transforming and projecting a 3-D object in a virtual 3-D space represented by a combination of polygons onto a projection plane in a view-point coordinate system to calculate front-color specifying data for every pixel and to synthesize an image to be displayed, the image synthesizing system comprising:

depth cueing information setting means for setting back-color specifying data used in the depth cueing depending on a scene displayed and for calculating the depth information of each polygon in the view-point coordinate system;

a first color palette responsive to the front-color specifying data output corresponding to each pixel for outputting a color signal as a front-color signal;

a second color palette responsive to the back-color specifying data for outputting a color signal as a back-color signal; and color signal calculation means responsive to the depth information, the front-color signal and the back-color signal for outputting a depth-cued color signal for each pixel.

In such an arrangement, the present invention requires less color palettes to provide a simplified and inexpensive circuit structure even if the brightness in the direction of depth is varied through a number of steps.

It is preferred that the image synthesizing system further comprises depth information transforming means for transforming the actual depth information Z of each polygon in the view-point coordinate system into a depth information Z' used in the depth cueing and wherein the color signal calculation means is responsive to the depth information Z' for the depth cueing, the front-color signal and the back-color signal for outputting a depth-cued color signal for each pixel.

According to the present invention, thus, the actual depth information Z of each polygon in the view-point coordinate system is transformed into the depth information Z' used in the depth cueing by the depth information transforming means and outputted. Therefore, the depth cueing can more effectively be carried out depending on the scene displayed.

The depth information transforming means comprises a plurality of translation table memories having stored different translation tables and can use any one of the translation tables to transform the actual depth information Z into the depth information Z' used in the depth cueing.

According to the present invention, thus, any one of the translation table memories having stored different translation tables is selected and used to transform the actual depth information Z into the depth information Z' used in the depth cueing, depending on the matter displayed and to output the depth information Z'. Therefore, the depth cueing can effectively be carried out depending on the matter displayed.

It is further preferred that the depth information transforming means comprises a translation table memory having stored a translation table for transforming the actual depth information Z of the each polygon in the view-point coordinate system into a depth information Z' used in the depth cueing and for outputting the depth information Z'; and a table rewriting means for rewriting the contents of the translation table stored in the translation table memory when the scene displayed is to be changed from one to another.

Since the translation table stored in the translation table memory is rewritten depending on the scene displayed, the depth cueing can more effectively be performed depending on the scene displayed.

If the second color palette is not used, it is preferred that the depth cueing information setting means is operative to set the back-color signal as brightness signal information for each of R, G and B colors and to progressively vary the brightness signal information toward a target level after the scene has been changed through passage of time.

It is further preferred that the depth cueing information setting unit calculates, when the previous scene is switched to the next scene, the black-color signal sequentially as the brightness signal information h given below for each of R,G and B colors, $$h=(j-i)\times(t/T)+i$$

where a target value of the brightness signal information in the previous scene is i, a target value of the brightness signal information in the next scene is j, time required for scene switching is T and the elapsed time is t.

Thus, the depth cueing process can smoothly be carried out when one scene is switched to another.

If the second color palette is to be used, it is preferred that when one scene is switched to another, calculates and outputs the back-color specifying data for reading the second color palette so that the brightness signal information of the back-color signal for each of the R, G, B colors will progressively be varied to the target value after the scene switching as time elapses.

It is further preferred that the depth cueing information setting unit calculates and outputs, when the previous scene is switched to the next scene, the back-color specifying data sequentially for reading the second color palette to obtain the brightness signal information h given below for each of R, G and B colors as the back-color signal, $$h=(j-i)\times(t/T)+i$$

where a target value of the brightness signal information in the previous scene is i, a target value of the brightness signal information in the next scene is j, time required for scene switching is T and the elapsed time is t.

In such a manner, the depth cueing process can smoothly be carried out when one scene is switched to another.

The depth cueing information setting means calculates and outputs a polygon identification data for identifying each polygon with respect to whether or not it should be subjected to the depth cueing, and the color signal calculation means is responsive to the polygon identification data for judging whether or not it is a pixel of the polygon to be processed and for calculating the depth-cued color signal for the pixel to be processed.

By determining whether or not a polygon to be displayed should be subjected to the depth cueing process and selectively performing the depth cueing process for each polygon, a matter not subjected to the depth cueing process can selectively be set on the display. If a night scene is to be displayed, for example, a polygon representing a window in a building may not be subjected to the depth cueing process so that the building can effectively be displayed as if the light is coming out from that window.

The first color palette can be formed to output color signals of R, G and B each having N steps of brightness, and the color signal calculation means can be operative to output the depth-cued color signal c for each pixel according to the following formula:

$$c=(b-a)\times(Z'/N)+a$$

where a is the front-color signal and b is the back-color signal.

When a given linear interpolation is carried out in such a manner, the depth-cued color signal can simply be determined for each pixel.

The present invention further provides a video game apparatus comprising:

a control unit; and the aforementioned image synthesizing system of the present invention being responsive to the input signals from the control unit for performing the calculation of a given game in which a 3-D object represented by a combination of polygons is displayed in a virtual 3-D game space according to a previously stored game program and for perspectively transforming and projecting the 3-D object onto a projection plane in a view-point coordinate system and for calculating a color specifying data of each pixel to synthesize a game image to be displayed on a display.

Thus, an image synthesizing system of simplified structure can be used to provide a video game apparatus which can display a depth-cued game image on the display.

DETAILED DESCRIPTION OF PREFERRED EMBODIMENTS

The present invention will now be described by way of examples with reference to the drawings.

Figure 2:
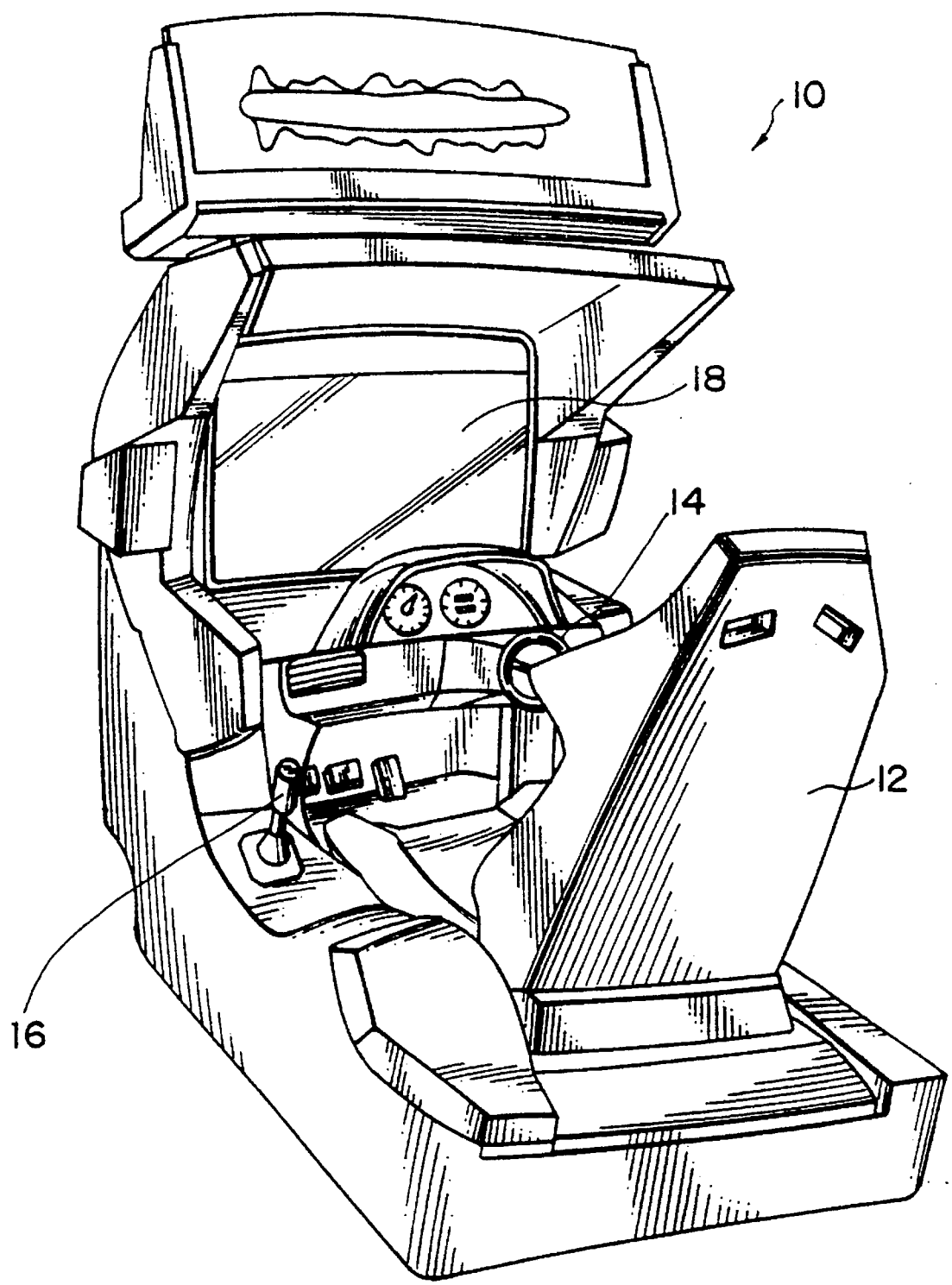
FIG. 2 is a perspective view of the outline of a video game apparatus for business use in which the image synthesizing system of FIG. 1 is used.

FIG. 2 schematically shows the outline of a video game machine 10 for business use which is constructed in accordance with one embodiment of the present invention.

The video game machine 10 is adapted to be manipulated by a player such that a player's racing car competes against the other racing cars controlled by a computer and other players for sequence and time.

For such a purpose, the video game machine 10 is formed to imitate the cockpit of an actual racing car. If a given game fee is paid, the game is started. The player on a sheet 12 manipulates a steering wheel 14, shift lever 16 and other pedals to control and drive a virtual racing car while viewing a variable scene displayed on a display 18.

Figure 1:
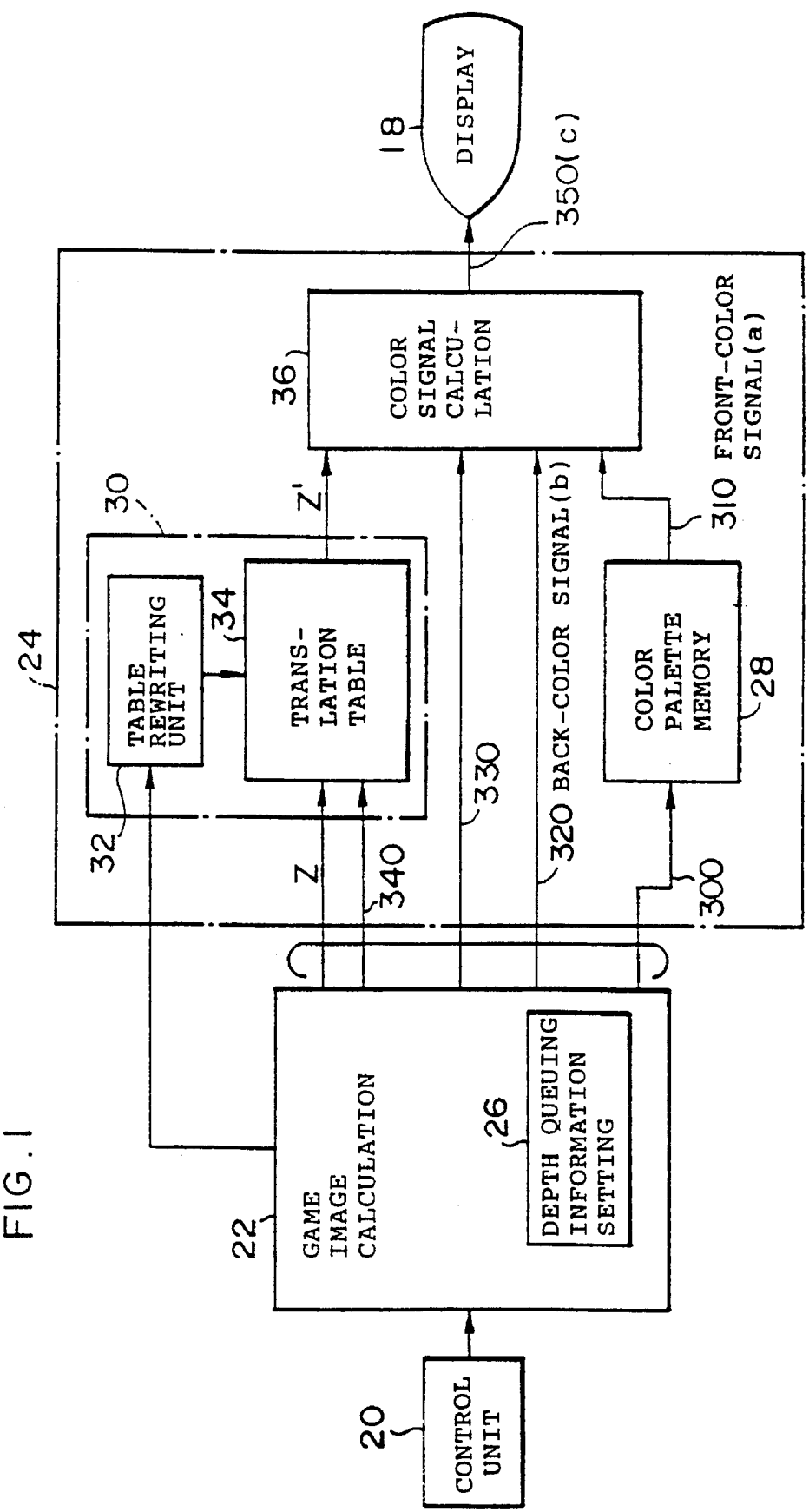
FIG. 1 is a block diagram of a video game image synthesizing system constructed in accordance with the present invention.

FIG. 1 shows a block diagram of the aforementioned video game machine 10.

The video game machine 10 comprises a control unit 20, a game image calculation unit 22 and a palette controller 24 in addition to the display 18.

The control unit 20 comprises parts manipulated by the player such as the steering wheel 14, shift lever 16 and pedals which are shown in FIG. 2.

The game image calculation unit 22 is responsive to the input signals from the control unit 20 for performing various game calculations according to a given game program and for displaying various driving game scenes on the display 18 using the palette controller 24. The game image calculation unit 22 is also operative to perform the game calculations so that the player's racing car will move in a given 3-D game space under the control of the player. Thus, various matters in the 3-D game space will be perspectively transformed and projected onto a given projection plane to form game scenes which are in turn displayed on the display 18.

Figure 3:
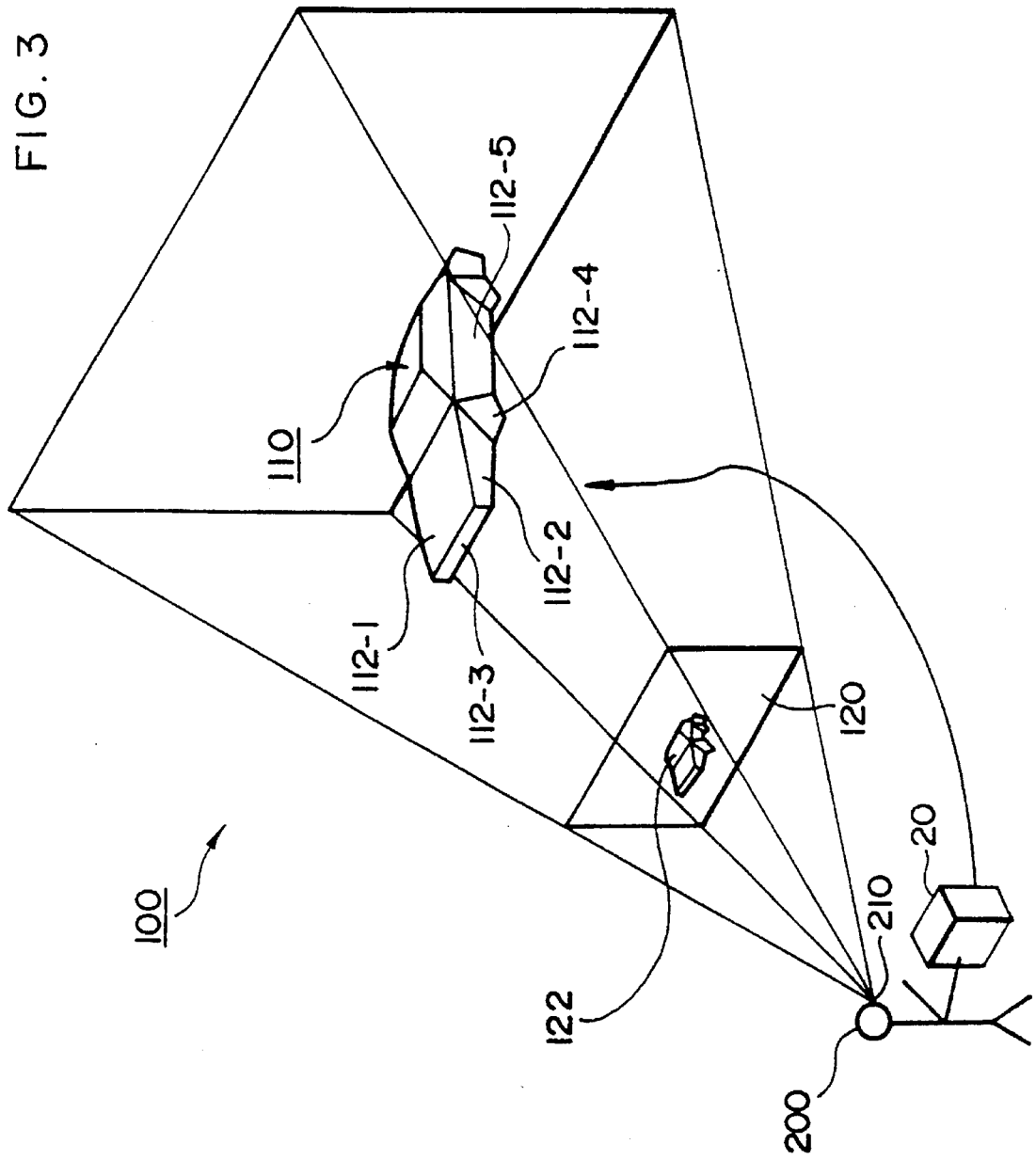
FIG. 3 is a diagram illustrating the principle of preparing a pseudo 3-D image in the image synthesizing system of the embodiment.

FIG. 3 illustrates the principle of such an image synthesis technique.

The game image calculation unit 22 of the embodiment has previously stored information of the 3-D game space 100 and 3-D object 110 which appears in this 3-D game space 100. The image information of the 3-D object 110 is represented by a shape model which comprises a plurality of polygons 112-1, 112-2, 112-3 and so on, which has previously been stored in a memory.

With the driving game, for example, the 3-D object 110 may be a racing car which appears in the 3-D game space 100. Various other 3-D objects representing roads, houses, backgrounds and so on are also disposed in the 3-D game space.

When a player 200 manipulates various control instruments in the control unit 20 to perform rotation, translation and other motions in the racing car, the game image calculation unit 22 responds to the control signals to perform various calculations of rotation, translation and other motions in the 3-D object 110 which may be a racing car, road or house, according to the game program. This 3-D object 110 and other 3-D objects are perspectively transformed and projected onto a perspective projection plane 120 of view-point coordinate system and displayed on the display 18 as pseudo 3-D image 122.

By manipulating the control unit 20 to control the racing car, the player 200 can undergo a virtual simulation in which he or she drives a racing car on a circuit course set in the 3-D game space 100.

The computer graphics technique forms the 3-D object 110 in the form of a shape model based on an independent body coordinate system. In other words, polygons forming the 3-D object 110 are disposed on the body coordinate system to form a shape model.

The 3-D game space 100 is formed by using a world coordinate system. The 3-D object 110 represented by use of the body coordinate system is disposed in the world coordinate system depending on its motion model.

The data are then transformed into data in a view-point coordinate system in which a view point 210 forms an origin with the direction of visual axis being in the positive direction of Z-axis. The transformed data is perspectively transformed and projected onto a screen coordinate system which forms the projection plane 120. The color specifying data 300 of the perspectively projected image is then calculated for each pixel and outputted toward the color palette memory 28 shown in FIG. 1.

The color palette memory 28 stores data of three primary colors R, G and B in 256 (0–255) different brightness for each color. The color specifying data 300 specifies brightness for each of the colors R, G and B. By combining these, a color signal is then outputted as a front-color signal 310. For example, the brightness of each primary color R, G or B may be represented by any numerical value ranging between 0 (minimum) and 255 (maximum). For example, the black color has no color. When the black color is represented by brightness values in (R, G, B), its brightness may be represented by (0, 0, 0). A pure red color may be represented by (255, 0, 0) while a color combined by red and blue colors may be represented by (124, 0, 44). A color signal composed by such a combination of color information is specified by the color specifying data 300 for each pixel and then outputted as the front-color signal 310.

Thus, an image as viewed from the view point 210 in the 3-D game space 100 will be color-displayed on the display 18.

Particularly, the game image calculation unit 22 of the present embodiment is adapted voluntarily to change the position of the view point 210 in the 3-D game space 100 which is defined by the world coordinate system. The video game machine of this embodiment has its view point above the driver's seat of the racing car during the game. Thus, a scene viewed forward from the player in the racing car cockpit will be displayed on the display 18 as a game scene. The player can drive his or her racing car as if he or she controls a real racing car.

The present invention is characterized by that the depth cueing process for color images displayed on the display can simply and effectively be performed without marked increase of the memory capacity such as the color palette memory 18 or the like.

For such a purpose, the image synthesizing system of the present embodiment comprises a depth cueing information setting unit 26 and a palette controller 24.

The depth cueing information setting unit 26 is located in the game image calculation unit 22 and operative to output a back-color signal 320 as brightness signal information of each color R, G or B depending on the displayed scene.

The present embodiment uses four scenes such as morning, daytime, evening and night scenes. The back-color signal may be calculated and outputted to be white color in the morning, blue color during daytime, red color in the evening and black color at night.

Figure 8:
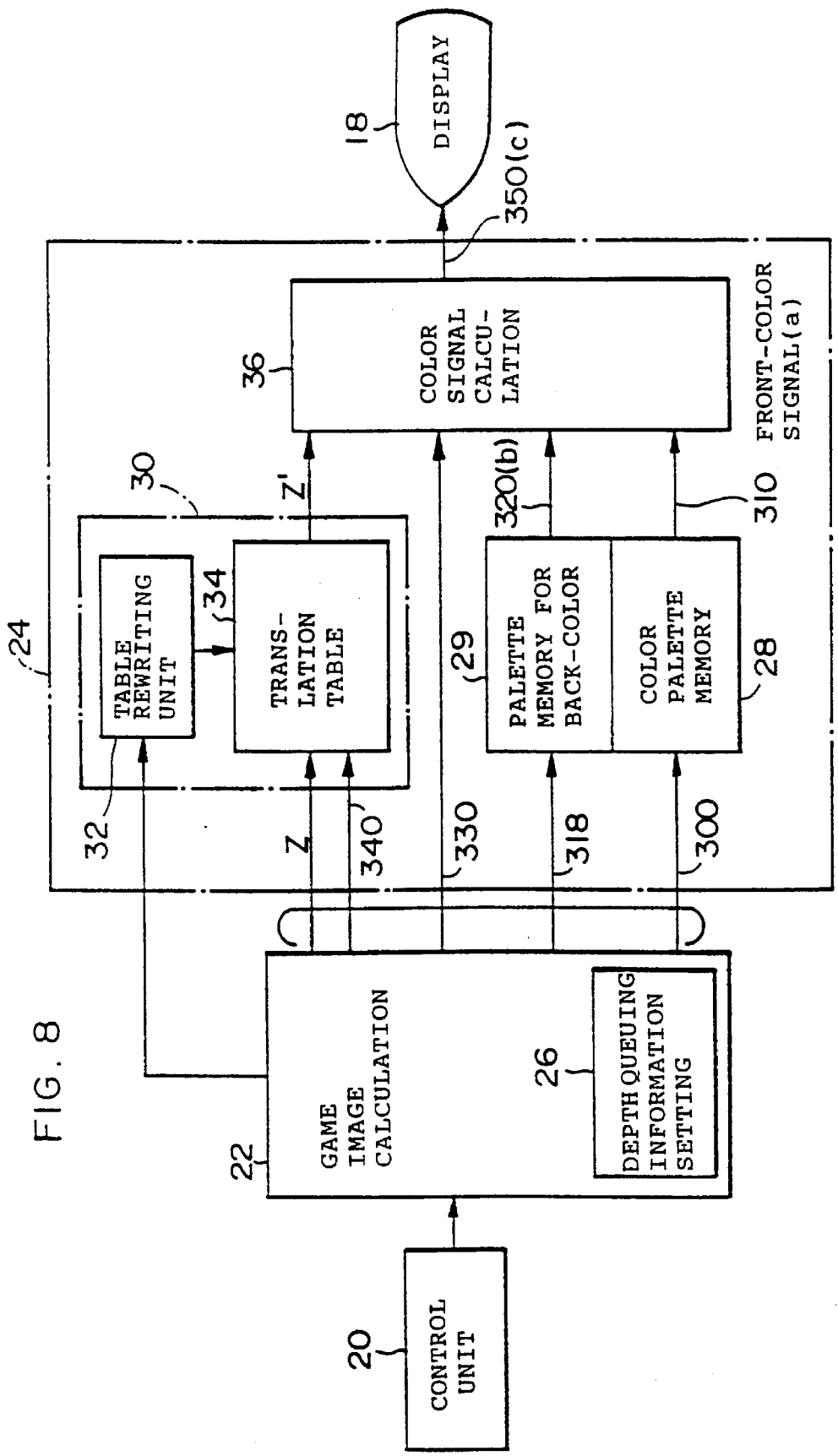
FIG. 8 is a block diagram of another video game image synthesizing system constructed in accordance with the present invention.

When a large number of color signals are handled by the game image calculation unit 22, it may raise a problem in calculation efficiency. For example, if a plurality of back-color signals are to be used in a single scene displayed, it is preferred that a palette memory for back-color 29 exclusive for back-color is used as shown in FIG. 8. Such a palette memory for back-color 29 has stored all the color signals used as back-color signals. In other words, a plurality of color signals comprising combinations of brightness in the three primary colors R, G and B have been stored in the palette memory for back-color 29 as back-color signals.

The depth cueing information setting unit 26 calculates a color specifying data 318 for reading a desired back-color signal 320 from the palette memory for back-color 29 depending on the displayed scene. The color specifying data 318 is then outputted toward the palette memory for back-color 29. Thus, the desired back-color signal 320 meeting the displayed scene can be outputted from the palette memory for back-color 29 with less burden on the game image calculation unit 22 even if a large number of back-color signals are used.

As shown in FIG. 1, the depth cueing information setting unit 26 further calculates a flag data 330 (polygon identification data) indicating whether or not a polygon should be subjected to the depth cueing process and calculates depth information Z (where Z is a representative value of polygon) and table specifying data 340 in the view-point coordinate system of that polygon. The flag data 330, table specifying data 340 and representative value Z will be outputted as associated data in synchronism with the color specifying data 300 outputted for each pixel.

The depth cueing information setting unit 26 is adapted to calculate and set the back-color signal as brightness signal information for each of the R, G and B colors. When the scene is changed from one to another, the brightness signal information is progressively changed to a target value after change of the scene.

If it is now assumed that time required to change the scene is T and the elapsed time from the change of scene is t, the change of the brightness signal from a target value i in the previous scene to a target value j in the next scene is calculated as the following brightness signal information h for each of the colors R, G and B:

$$h=(j-i)\times(t/T)+i \tag{1}$$

The brightness signal information thus calculated for the respective colors R, G and B is sequentially outputted as back-color signals when the scene is changed. Thus, the scene on its change can naturally be displayed.

If the palette memory for back-color 29 is used as shown in FIG. 8, the depth cueing information setting unit 26 may be formed to calculate the back-color specifying data 318 such that the back-color signals will be out putted from the palette memory for back-color 29 while progressively varying them when the scene is changed from one to another. In such a manner, scene on its change can be displayed naturally in the embodiment as shown in FIG. 8, as in the embodiment of FIG. 1.

The palette controller 24 comprises an information transforming unit 30 and a color signal calculating unit 36 in addition to the color palette memory 28.

The information transforming unit 30 is operative to transform the depth information Z of each polygon in the view-point coordinate system into a depth information Z' used in the depth cueing process, which is in turn outputted therefrom toward the color signal calculating unit 36.

In this embodiment, the information transforming unit 30 comprises a table rewriting unit 32 and a translation table unit 34.

The table rewriting unit 32 is responsive to a scene setting data for each displayed scene (e.g., morning, daytime, evening or night scene) calculated and set by the game image calculation unit 22 for calculating and setting a translation table 34 matching the scene displayed. The translation table is to transform the depth information Z into the depth information Z' used in the depth cueing process and to output it. Depending on how the depth information 34 is set, the atmosphere in the respective displayed scenes can effectively be produced as will be described.

The color signal calculating unit 36 is responsive to the data so inputted for judging whether or not an inputted color signal 310 should be subjected to the depth cueing process. If it is judged that the color signal 310 should be processed, a given depth cueing process is carried out to output a depth-cued color signal 350 which is in turn converted into a digital signal by an A/D converter (not shown) and inputted into the display 18.

More particularly, the color signal calculating unit 36 responds to the flag data 330 outputted for each pixel to judge whether or not the color signal 310 of that pixel should be subjected to the depth cueing process. If it is judged that the color signal 310 is not to be processed, it will be fed directly to the display 18. If it is judged that the color signal 310 should be processed, the color signal calculating unit 36 calculates the color signal on the basis of the front-color signal 310 from the color palette memory 28, the inputted back-color signal 320 and the transformed depth information Z' from the translation table unit 34 according to the following formula:

$$C=(b-a)\times(Z'/N)+a \tag{2}$$

where a is the front-color signal 310, b is the back-color signal 320 and N is the step of brightness in the color palette memory 28 (in this embodiment, N=256).

The depth-cued color signal C thus determined is then outputted therefrom toward the display 18.

In such a manner, the depth-cued color signal can be calculated and displayed on the display 18 for each polygon.

Figure 4:
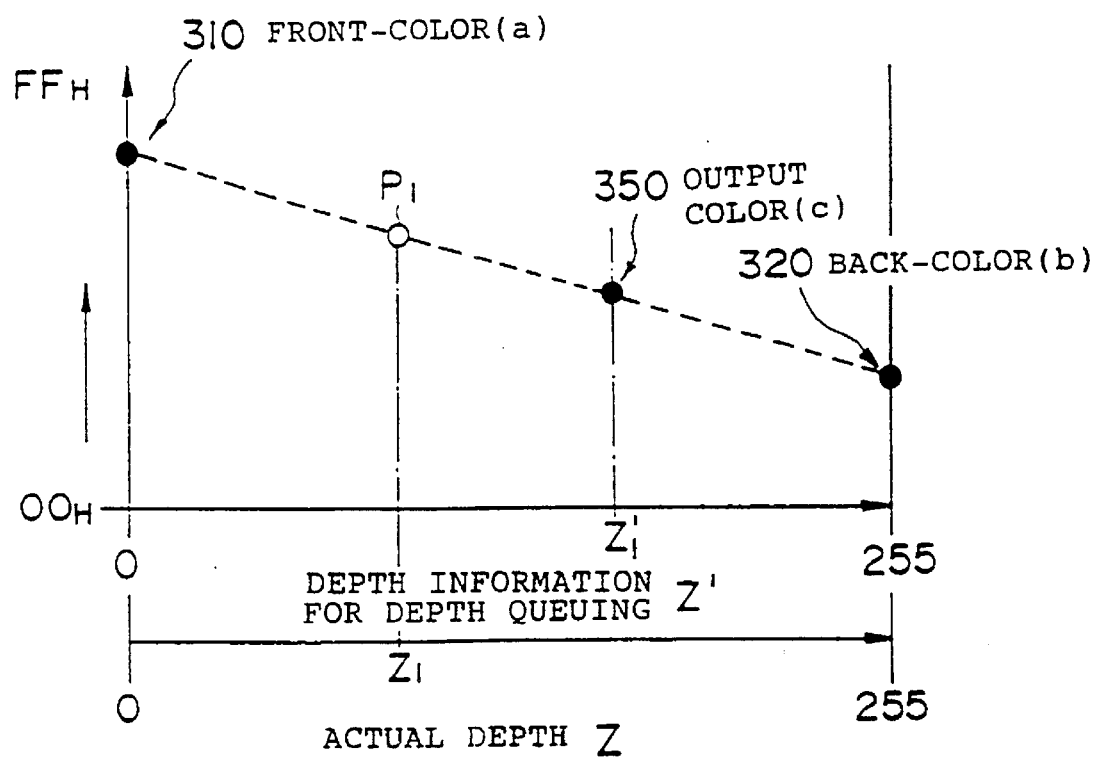
FIG. 4 is a diagram illustrating the principle of the depth cueing process in the image synthesizing system of the embodiment.

FIG. 4 shows the principle of the depth cueing process in this embodiment. In this figure, the front-color 310 and back-color 320 are set at their depth positions Z' equal to 0 and 255, respectively. The fact that the back-color 320 is set at Z'=255 means that the depth-cued output color will progressively fade into the back-color 320 as the depth Z' for each polygon increases.

In other words, the output color 350 for each pixel can be determined from depth cueing depth information Z', front-color a, back-color b and others through the linear interpolation according to the aforementioned formula (2).

Such a linear interpolation is performed for each of three primary colors R, G and B outputted from the color palette memory 28 as front-color signals 310. Thus, the depth-cued color signal C can be outputted by using the color palette memory 28 into which the basic color data have been written.

In this embodiment, particularly, the palette controller 24 is adapted to transform the actual depth information Z for each pixel into the depth cueing depth information Z' through the translation table which is in turn used for the depth cueing process, rather than using the actual depth information Z for the depth cueing process. When the actual depth information Z is used to make the linear interpolation, the output color C becomes P1 shown in FIG. 4. On the contrary, this embodiment transforms the actual depth information Z into a depth information Z' suitable for a displayed scene, which is in turn used to provide the depth-cued output color 350.

The present invention can accomplish the depth cueing process by use of the actual depth information, but can also more effectively perform the depth cueing process by transforming the actual depth information Z into the depth information Z' suitable for the depth cueing process through the information transforming unit 30 as in this embodiment.

Further, this embodiment can make the optimum depth cueing process for the displayed scene by switching the translation table stored in the translation table unit 34 from one to another depending on the displayed scene.

The translation table may be common to all the polygons. However, a plurality of translation tables 34 may be provided to be selected by the table specifying data 340 for the property of each polygon (or the property of an object to be displayed). This enables more delicate depth cueing, such as a lighted matter in the night or automobile tail lamps viewed in the fog.

A plurality of back-color signals 320 may be provided for one scene. For example, this enables display of a scene such as approaching a tunnel with yellow illumination at night using a depth cueing process such that the interior of a tunnel is represented by an yellow back-color signal while the part other than the tunnel is represented by a black back-color signal indicating the night scene. Thus, the present invention can provide a depth cueing process enriched in stage effects.

Figure 5:
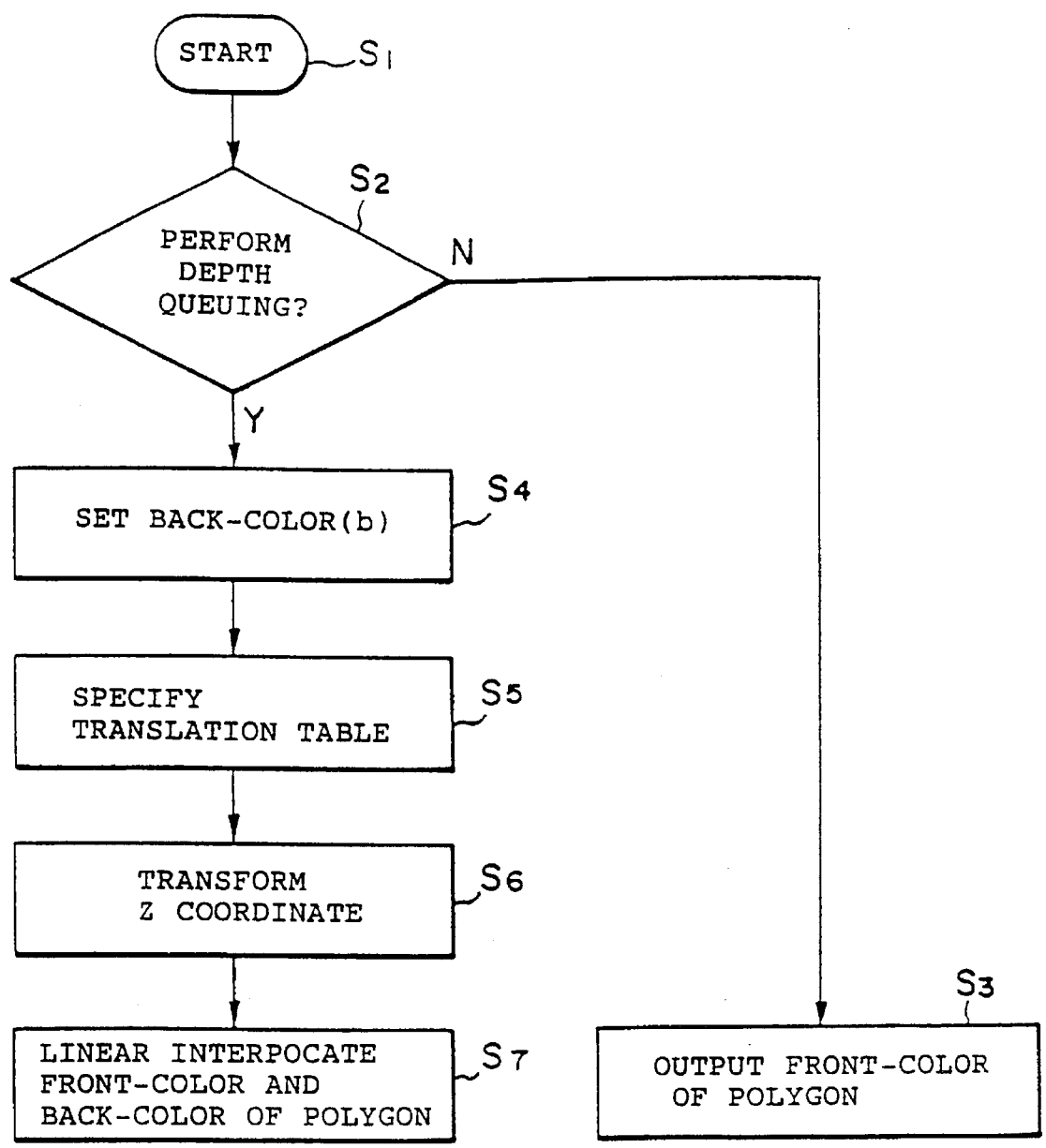
FIG. 5 is a flow chart illustrating the depth cueing process in the image synthesizing system of the embodiment.
Figure 6:
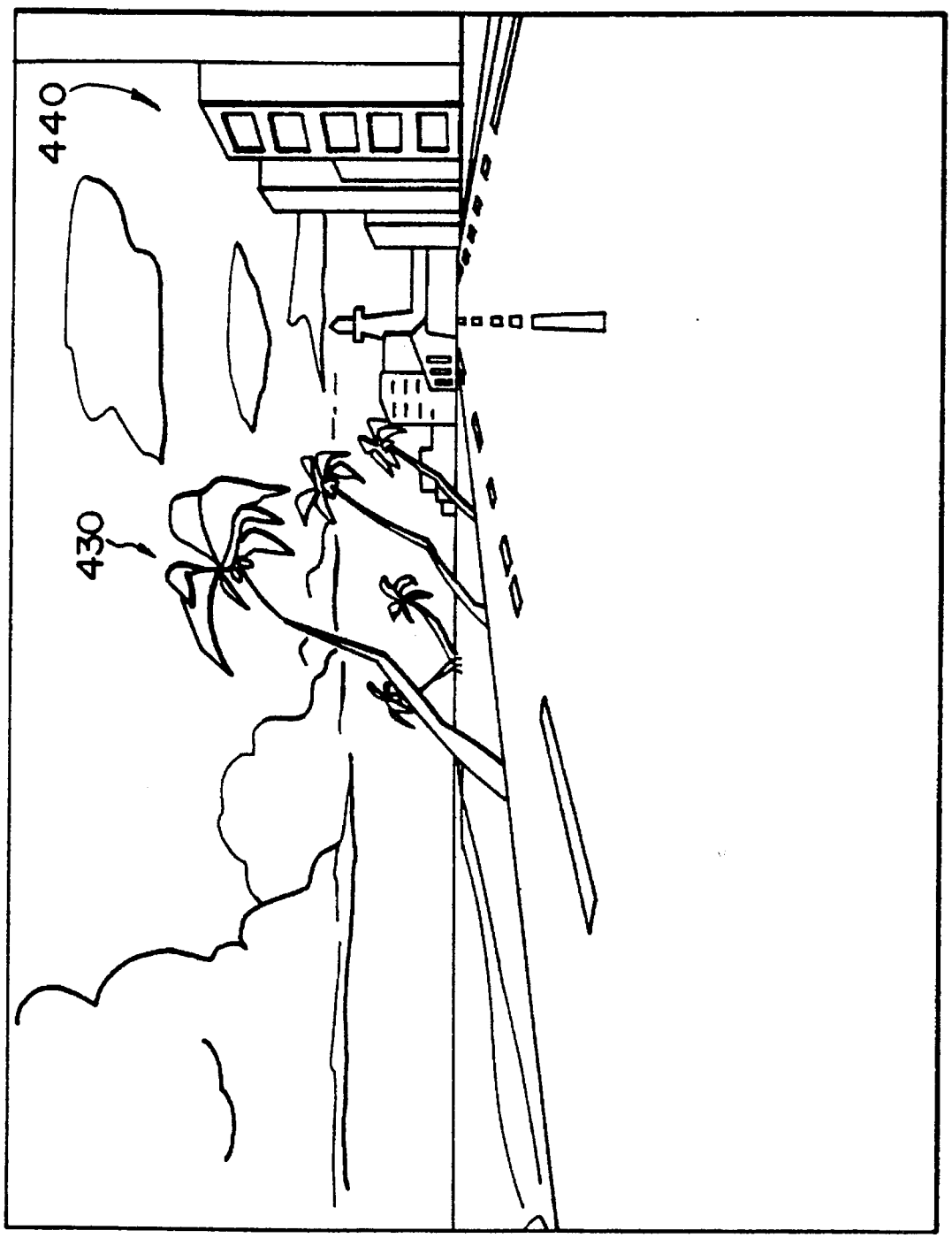
FIG. 6 is a diagram illustrating a game scene prepared by the image synthesizing system of the embodiment.
Figure 7:
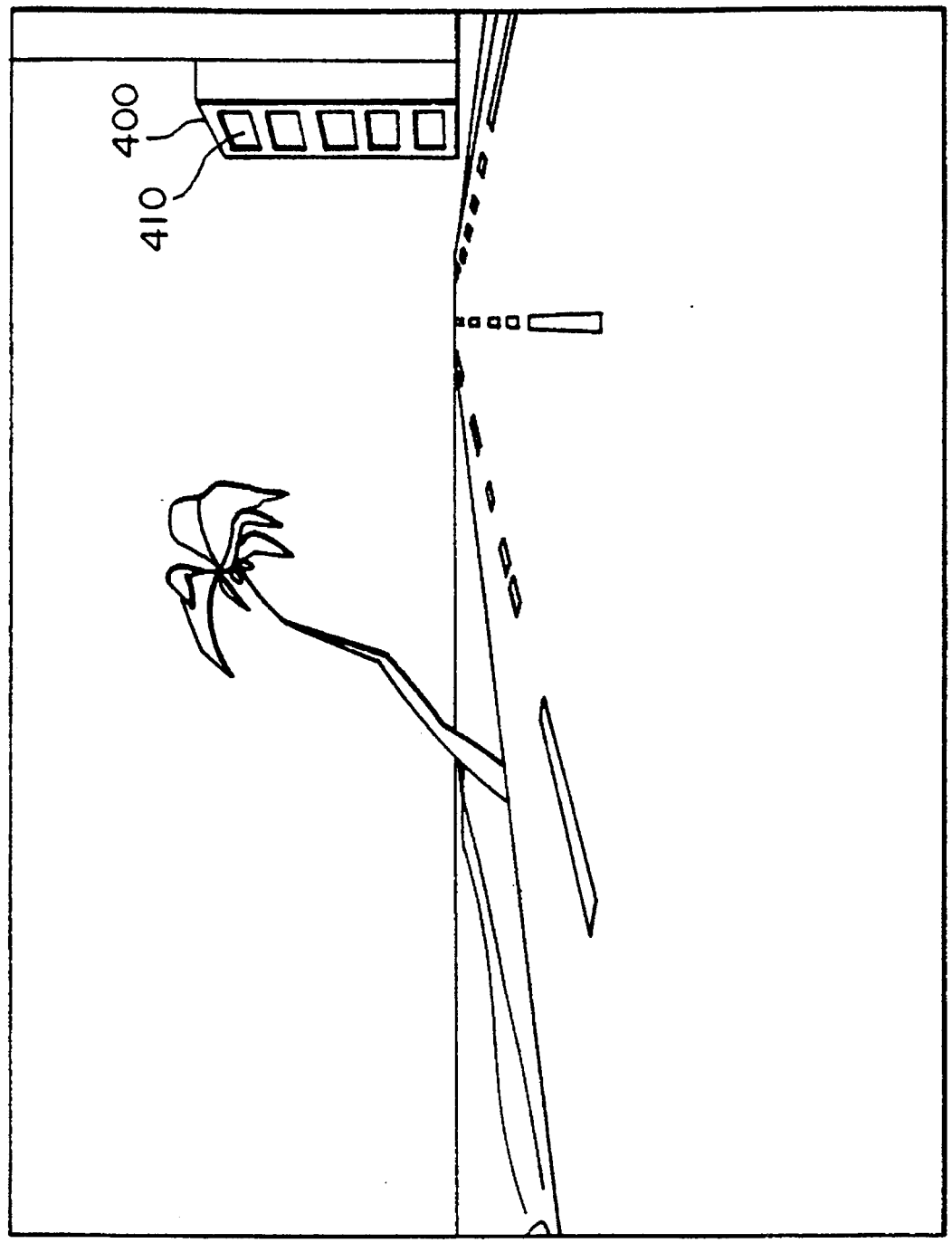
FIG. 7 is a diagram illustrating a game scene representing a night scene subjected to the depth cueing process.

FIG. 5 shows a flow chart illustrating the depth cueing process in this embodiment while FIGS. 6 and 7 show examples of a scene displayed according to this depth cueing process.

First of all, the game image calculation unit 22 calculates a game scene shown in FIG. 6 and assumes that such a game scene is displayed on the display 18 without the depth cueing process. In such a case, the game image calculation unit 22 outputs flag data 330 indicating no depth cueing process for all the pixels and also outputs color specifying data 330 for each pixel.

Through steps S1, S2 and S3 in FIG. 5, therefore, the color signals 310 outputted from the color palette memory 28 will be displayed directly on the display 18.

Then, it is assumed that game scenes to be displayed on the display 18 are classified into four types, morning, daytime, evening and night and the game image calculation unit 22 performs an independent depth cueing process for each scene.

In a misty morning scene, the back-color signal 320 may be set to be white color indicating the mist. In a daytime scene, the back-color signal may be set to be blue color indicating the clear state (in which the distant view will fade into blue sea or sky). In an evening scene, the back-color signal may be set to be red color indicating the sunset glow. In a night scene, the back-color signal may be set to be black color indicating the darkened surroundings. At this time, the back-color signals 320 are progressively changed from one to another according to the following formula such that the change of color takes place naturally when the scenes are switched from one to another.

$$b = (b2 - b1) \times (k/255) + b1 \quad (3)$$

where b represents a calculated and set back-color signal; b1 a back-color signal in the previous scene; b2 a back-color signal in the next scene and k a continuous or discontinuous variable ranging between 0 and 255 for each frame.

The table rewriting unit 32 sequentially rewrites the translation tables in the translation table unit 34 into Z'=f1(Z), Z'=f2(Z), z'=f3(Z) and z'=f4(Z) for the respective morning, daytime, evening and night scenes. On the switching of scenes, the rewriting will be carried out in such a manner that the change of color takes place naturally. For example, on switching of the morning scene to the daytime scene, the translation table will be rewritten such that f1(Z) will progressively approach to f2(Z).

It is now assumed that the transformation of depth information Z is represented by the following transformation formulas of linear function:

f1(Z)=1.5.Z and f2(Z)=2.0.Z, the translation table f(Z) may progressively be changed from f(Z)=1.5.Z through f(Z)=1.6.Z, f(Z)= 1.7.Z . . . to f(Z)=2.0.Z when the set scene is switched from one to another.

During the depth cueing process, the game image calculation unit 22 calculates and outputs color specifying data 300 for each of the pixels forming a game scene and also outputs back-color signal 320, flag data 330, table specifying data 340 and depth information Z as associated data for the depth cueing in synchronism with the output of the color specifying data 300. In the embodiment of FIG. 8, the back-color signals 320 are outputted from the palette memory for back-color 29.

Based on the flag data 330 for each pixel, it is judged whether or not that pixel should be subjected to the depth cueing process (step S2). If it should be processed, the back-color signal 320 is set (step S4). Further, the translation table to be used 34 is selected by the table specifying data 340. The selected translation table is then used to transform the representative value Z of polygon into a depth information Z' for the depth cueing.

Based on the resulting data, the color signal 310 from the color palette memory 28 is subjected to the linear interpolation according to the formula (2) to form and output the depth-cued color signal 350 (step S7).

Such a process will be repeated for all the pixels. Particularly, the polygons specified by the flag data 330 such that it should be subjected to the depth cueing process is selectively subjected to the depth cueing process (steps S5–S7).

Accordingly, in a morning scene, for example, such an arrangement sets the translation table unit 34 at Z'=f1(Z), which is a translation table for a morning scene, and the back-color signal 320 as white-color. At this time, the game scene shown in FIG. 6 will be misty morning through the depth cueing process.

In the system of this embodiment, the contents of the translation table unit 34 is adapted to be selected by the table specifying data 34 for each displayed polygon. Thus, a group of polygons 430 representing parts adjacent the seaside (left side in FIGS. 6 and 7) can use a translation table setting different from that of a group of polygons 440 representing parts on the ground (right side in FIGS. 6 and 7). As a result, coconut trees adjacent the seaside will be displayed as matters hidden in fog while buildings shown on the right side will be displayed as if they are viewed from a relatively far distance.

When the morning scene is to be switched to the daytime scene, the contents of the translation table unit 34 is rewritten to change from f1(Z) gradually to f2(Z). The back-color signal 320 is also set to change from white color progressively to blue color.

Thus, the game scene shown in FIG. 6 will be displayed as a bright daytime scene reflected by blue sky. At this time, the translation table unit 34 transforms the depth information Z into the depth information Z' for the depth cueing such that the farther distance matters can clearly be looked out over.

When the daytime scene is changed to an evening scene, the contents of the translation table unit 34 is rewritten and the back-color signal 320 is set at red color to provide a sunset glow atmosphere. Thus, the game scene shown in FIG. 6 will be displayed as a sunset glow scene.

When the evening scene is shifted to a night scene, the contents of the translation table unit 34 is rewritten and the back-color signal 320 is set at black color to represent the darkness in the night. This time it is required that the translation table unit 34 processes the images such that the matters relatively well viewed in the game scene of FIG. 6 become hidden by the darkness in the night. For such a purpose, a translation table may be provided such that matters spaced away from the view point a given distance are substantially hidden. As shown in FIG. 7, such a translation table can provide a night scene in which all the matters spaced away from the view point a given distance are represented by black color fading into the back-color signal.

In the image synthesizing system of this embodiment, such a depth cueing process is carried out for every polygon. Therefore, by calculating and setting the flag data 330 such that polygons representing the windows 410 of the building 400 not to go through the depth cueing process, a game scene can be synthesized and displayed in which only windows 410 on a building 400 in the dark scene become bright.

When the matters not subjected to the depth cueing process are selectively set and displayed on the screen, various effects such as "lights in night" or "head lights of the opposite car" can effectively be provided.

Although the embodiment of the present invention has been described as to time changes of morning, daytime, evening and night, the present invention is not limited to such a case, but may be applied to any other specific scenes such as variation in weather (fog, cloud, mist and others) or other specific stage effect.

Although the embodiment of the present invention has been described as to a plurality of translation table memories which have stored different translation tables rewritten for different displayed scenes, the present invention may similarly be applied to the depth cueing process with no rewriting to the translation tables in the translation table memory.

Although the embodiment of the present invention has been described as to the synthesis of game scenes in the video game machine, the present invention is not limited to such a case, but may similarly be applied to any other application such as 3-D simulator or other application.

The image synthesizing system of the present invention may broadly be applied to any image synthesizing system which outputs color specifying data 300 through the texture mapping, painting or other image synthesis technique.

I claim:

1. An image synthesizing system for perspectively transforming and projecting a 3-D object in a virtual 3-D space represented by a combination of polygons onto a projection plane in a view-point coordinate system to calculate front-color specifying data for every pixel and to synthesize an image to be displayed, said image synthesizing system comprising:

depth cueing information setting means for setting back-color signals used in the depth cueing depending on a scene displayed and for calculating the depth information of said each polygon in said view-point coordinate system;

a first color palette responsive to said front-color specifying data output corresponding to each pixel for outputting a color signal as a front-color signal; and color signal calculation means responsive to said depth information, said front-color signal and said back-color signal for outputting a depth-cued color signal for each pixel.

2. An image synthesizing system as defined in claim 1, further comprising depth information transforming means for transforming the actual depth information Z of said each polygon in said view-point coordinate system into a depth information Z' used in the depth cueing and wherein said color signal calculation means is responsive to said depth information Z' for the depth weing, said front-color signal and said back-color signal for outputting a depth-cued color signal for each pixel.

3. An image synthesizing system as defined in claim 2 wherein said depth information transforming means comprises a plurality of translation table memories having stored different translation tables and can use any one of said translation tables to transform the actual depth information Z into the depth information Z' used in the depth cueing.

4. An image synthesizing system as defined in claim 3 wherein said depth cueing information setting means is operative to set said back-color signal as brightness signal information for each of R, G and B colors and to progressively vary said brightness signal information toward a target level after the scene has been changed through passage of time.

5. An image synthesizing system as defined in claim 3 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

6. An image synthesizing system as defined in claim 2 wherein said depth information transforming means comprises a translation table memory having stored a translation table for transforming the actual depth information Z of said each polygon in said view-point coordinate system into a depth information Z' used in the depth cueuing and for outputting said depth information Z'; and a table rewriting means for rewriting the contents of the translation table stored in said translation table memory when the scene displayed is to be changed from one to another.

7. An image synthesizing system as defined in claim 6 wherein said depth cueing information setting means is operative to set said back-color signal as brightness signal information for each of R, G and B colors and to progressively vary said brightness signal information toward a target level after the scene has been changed through passage of time.

8. An image synthesizing system as defined in claim 6 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

9. An image synthesizing system as defined in claim 2 wherein said depth cueing information setting means is operative to set said back-color signal as brightness signal information for each of R, G and B colors and to progressively vary said brightness signal information toward a target level after the scene has been changed through passage of time.

10. An image synthesizing system as defined in claim 9 wherein said depth cueing information setting means calculates and outputs a polygon identification data for identifying each polygon with respect to whether or not it should be subjected to the depth cueing, and said color signal calculation means is responsive to said polygon identification data lot judging whether or not it is a pixel of the polygon to be processed and for calculating the depth-cued color signal for the pixel to be processed.

11. An image synthesizing system as defined in claim 2 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

12. An image synthesizing system as defined in claim 1 wherein said depth cueing information setting means is operative to set said back-color signal as brightness signal information for each of R, G and B colors and to progressively vary said brightness signal information toward a target level after the scene has been changed through passage of time.

13. An image synthesizing system as defined in claim 12 wherein said depth cueing information setting unit calculates, when the previous scene is switched to the next scene, said black-color signal sequentially as said brightness signal information h given below for each of R, G and B colors, $$h=(j-i)\times(t/T)+i$$

where a target value of said brightness signal information in the previous scene is i, a target value of said brightness signal information in the next scene is j, time required for scene switching is T and the elapsed time is L.

14. An image synthesizing system as defined in claim 12 wherein said depth cueing information setting means calculates and outputs a polygon identification data for identifying each polygon with respect to whether or not it should be subjected to the depth cueing, and said color signal calculation means is responsive to said polygon identification data lot judging whether or not it is a pixel of the polygon to be processed and for calculating the depth-cued color signal for the pixel to be processed.

15. An image synthesizing system as defined in claim 1 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

16. An image synthesizing system as defined in claim 1 wherein said first color palette is formed to output color signals of R, G and B each having N steps of brightness, and said color signal calculation means is operative to output the depth-cued color signal c for each pixel according to the following formula:

$$c=(b-a)\times(Z'/N)+a$$

where a is said front-color signal and b it said back-color signal.

17. A video game apparatus comprising:

a control unit; and an image synthesizing system as defined in claim 1, said image synthesizing system being responsive to the input signals from said control unit for performing the calculation of a given game in which a 3-D object represented by a combination of polygons is displayed in a virtual 3-D game space according to a previously stored game program and for perspectively transforming and projecting said 3-D object onto a projection plane in view-point coordinate system and for calculating a color specifying data of each pixel to synthesize an image to be displayed on a display.

18. An image synthesizing system for perspectively transforming and projecting a 3-D object in a virtual 3-D space represented by a combination of polygons onto a projection plane in a view-point coordinate system to calculate front-color specifying data for every pixel and to synthesize an image to be displayed, said image synthesizing system comprising:

depth cueing information setting means for setting back-color specifying data used in the depth cueing depending on a scene displayed and for calculating the depth information of said each polygon in said view-point coordinate system;

a first color palette responsive to said front-color specifying data output corresponding to each pixel for outputting a color signal as a front-color signal;

a second color palette responsive to said back-color specifying data for outputting a color signal as a back-color signal; and color signal calculation means responsive to said depth information, said front-color signal and said back-color signal for outputting a depth-cued color signal for each pixel.

19. An image synthesizing system as defined in claim 18, further comprising depth information transforming means for transforming the actual depth information Z of said each polygon in said view-point coordinate system into a depth information Z' used in the depth cueing and wherein said color signal calculation means is responsive to said depth information Z' for the depth cueing, said front-color signal and said back-color signal for outputting a depth-cued color signal for each pixel.

20. An image synthesizing system as defined in claim 19 wherein said depth information transforming means comprises a plurality of translation table memories having stored different translation tables and can use any one of said translation tables to transform the actual depth information Z into the depth information Z' used in the depth cueing.

21. An image synthesizing system as defined in claim 20 wherein said depth cueing information setting means, when one scene is switched to another, calculates and outputs said back-color specifying data for reading the second color palette so that the brightness signal information of said back-color signal for each of the R, G, B colors will progressively be varied to the target value after the scene switching as time elapses.

22. An image synthesizing system as defined in claim 20 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

23. An image synthesizing system as defined in claim 19 wherein said depth information transforming means comprises a translation table memory having stored a translation table for transforming the actual depth information Z of said each polygon in said view-point coordinate system into a depth information Z' used in the depth cueing and for outputting said depth information Z'; and a table rewriting means for rewriting the contents of the translation table stored in said translation table memory when the scene displayed is to be changed from one to another.

24. An image synthesizing system as defined in claim 23 wherein said depth cueing information setting means, when one scene is switched to another, calculates and outputs said back-color specifying data for reading the second color palette so that the brightness signal information of said back-color signal for each of the R, G, B colors will progressively be varied to the target value after the scene switching as time elapses.

25. An image synthesizing system as defined in claim 23 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

26. An image synthesizing system as defined in claim 19 wherein said depth cueing information setting means, when one scene is switched to another, calculates and outputs said back-color specifying data for reading the second color palette so that the brightness signal information of said back-color signal for each of the R, G, B colors will progressively be varied to the target value after the scene switching as time elapses.

27. An image synthesizing system as defined in claim 26 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

28. An image synthesizing system as defined in claim 19 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

29. An image synthesizing system as defined in claim 18 wherein said depth cueing information setting means, when one scene is switched to another, calculates and outputs said back-color specifying data for reading the second color palette so that the brightness signal information of said back-color signal for each of the R, G, B colors will progressively be varied to the target value after the scene switching as time elapses.

30. An image synthesizing system as defined in claim 29 wherein said depth cueing information setting unit calculates and outputs, when the previous scene is switched to the next scene, said back-color specifying data sequentially for reading said second color palette to obtain said brightness signal information h given below for each of R, G and B colors as said back-color signal, $$h = (i-j) \times (t/T) + i$$

where a target value of said brightness signal information in the previous scene is i, a target value of said brightness signal information in the next scene is j, time required for scene switching is T and the elapsed time is t.

31. An image synthesizing system as defined in claim 29 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cured color signal for the pixel to be processed.

32. An image synthesizing system as defined in claim 18 wherein said depth cueing information setting means calculates and outputs a polygon identification data for identifying each polygon with respect to whether or not it should be subjected to the depth cueing, and said color signal calculation means is responsive to said polygon identification data for judging whether or not it is a pixel of the polygon to be processed and for calculating the depth-cued color signal for the pixel to be processed.

33. An image synthesizing system as defined in claim 18 wherein said first color palette is formed to output color signals of R, G and B each hiving N steps of brightness, and said color signal calculation means is operative to output the depth-cued color signal c for each pixel according to the following formula:

$$c=(b-a)\times(Z'/N)+a$$

where a is said front-color signal and b is said back-color signal.

34. A video game apparatus comprising:

a control unit; and an image synthesizing system as defined in claim 18, said image synthesizing system being responsive to the input signals from said control unit for performing the calculation of a given game in which a 3-D object represented by a combination of polygons is displayed in a virtual 3-D game space according to a previously stored game program and for perspectively transforming and projecting said 3-D object onto a projection plane in view-point coordinate system and for calculating a color specifying data of each pixel to synthesize an image to be displayed on a display.

\* \* \* \* \*